N. D. NIELSEN.
MIXING OR STIRRING MEANS.
APPLICATION FILED MAR. 22, 1918.

1,276,254.

Patented Aug. 20, 1918.
2 SHEETS—SHEET 1.

NIELS D. NIELSEN
INVENTOR

BY J.O.Richey
HIS ATTORNEY

N. D. NIELSEN.
MIXING OR STIRRING MEANS.
APPLICATION FILED MAR. 22, 1918.

1,276,254.

Patented Aug. 20, 1918.
2 SHEETS—SHEET 2.

NIELS D. NIELSEN
INVENTOR.

BY *J. O. Richey*
ATTORNEY

UNITED STATES PATENT OFFICE.

NIELS D. NIELSEN, OF ELYRIA, OHIO.

MIXING OR STIRRING MEANS.

1,276,254.　　　　Specification of Letters Patent.　　Patented Aug. 20, 1918.

Application filed March 22, 1918. Serial No. 223,908.

*To all whom it may concern:*

Be it known that I, NIELS D. NIELSEN, a citizen of the United States, residing at Elyria, in the county of Lorain and State of Ohio, have invented certain new and useful Improvements in Mixing or Stirring Means; and I do hereby declare the following to be a full, clear, and exact description of the invention, such as will enable others skilled in the art to which it appertains to make and use the same.

My invention relates to means for mixing or stirring liquids of various kinds, or liquids and solids or semi-solids.

I aim to thoroughly agitate or mix the liquid, etc., in a vessel, and to expose the mass thereof to mediums for heating, cooling or the like.

I also aim to produce apparatus which is simple and easy to make, install and operate.

I also aim to prevent any eddies in the mass of liquid in the tank, and to forcibly subject all parts of the liquid to the mixing and such medium or mediums as I have mentioned.

I also aim to produce apparatus which can be easily removed from one vessel and installed upon another.

These and other objects of my invention and the invention itself will be further explained in connection with the illustration and description of particular embodiments thereof.

Figure 1:
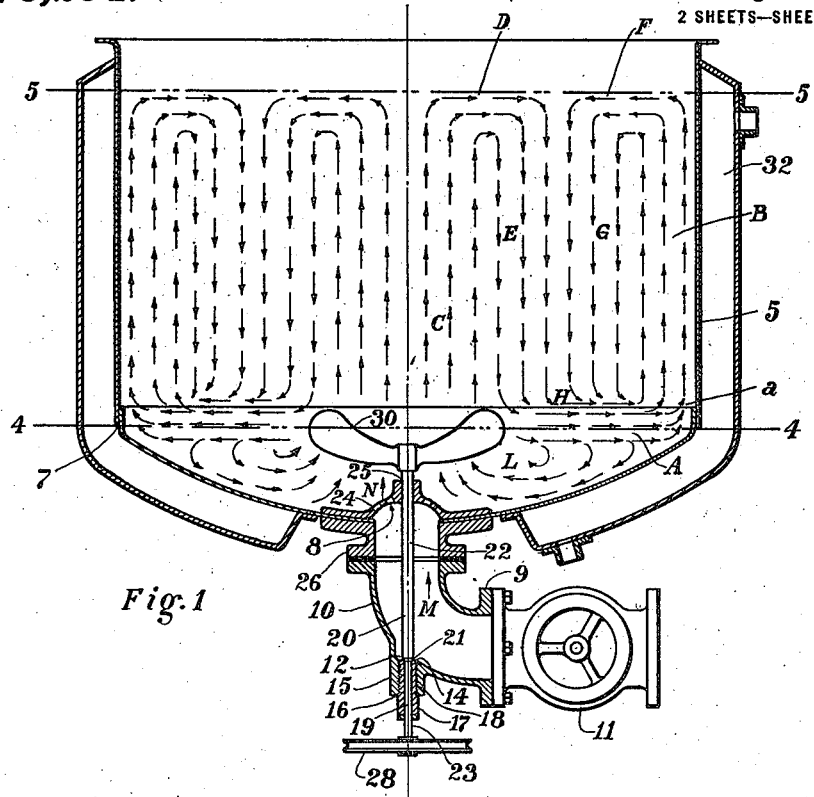
Figure 1 is a cross section through an embodiment of my invention showing the parts assembled.

Referring now to the drawings and to the embodiments of the invention shown therein, at 5 is shown a tank, here illustrated as having cylindrical side walls. The bottom of the tank is so constructed that the liquid, etc. cast against it is deflected away. The best results are secured by inclining this part of the tank downwardly to the center on all sides from the line 7 where the edges of the side walls and bottom meet. In the embodiment shown a saucer-shaped bottom is employed. An opening 8 is formed in the bottom of the tank, and here illustrated in the geometrical center thereof. A pipe 9 is connected to the tank at the opening 8.

This pipe includes an elbow 10, which is here shown as a curved coupling. A valve 11 is shown in the pipe for controlling the flow therethrough. The valve is best placed as closely as possible to the tank. The elbow or coupling is provided with a pocket 12 and a thrust bearing 14 at the bottom thereof. A nipple 15 is formed on the elbow at the pocket 12, and an opening 16 is formed therethrough. A sleeve 17 is fastened in this opening by suitable means, such as threads 18.

The sleeve 17 is provided with a bore 19, through which a shaft 20 extends. The shaft 20 is provided with a thrust bearing 21 which coöperates with the thrust bearing 14. The upper portion of the shaft 22 is shown of greater diameter than the lower portion 23. The openings 8 and 16 are in alinement and the shaft extends through the opening 8 into the tank.

In the embodiment shown in Fig. 1, the upper part of the shaft is braced by a bracket 24, which is provided with a bore and bearing 25 for the shaft. In the embodiment shown the pipe 9 also includes a coupling 26 by which the elbow 10 is connected to the tank. Of course, any suitable coupling may be employed, or it may be omitted and the part 10 connected directly to the tank. Means are mounted upon one end of the shaft for rotating the same, here shown as a pulley 28 through which the shaft may be rotated. Liquid agitating or mixing means is mounted upon the other end of the shaft and is here shown as a propeller 30, which is positioned near the bottom of the tank, so that when operated it will hurl liquid radially in a substantially horizontal plane against the curved walls of the bottom of the tank, as illustrated, first, at A and, second, at B in Fig. 1.

The liquid is also driven, as indicated at C, upward in the central portion of the tank. When starting from rest, the stream at C becomes effective before that at B.

The tank is made considerably wider than the propeller, say more than one and a half times as wide, in order that the liquid rising at C may fall over at D and downward, as indicated at E, joining the liquid which rises at B, falls over as indicated at F and downward as indicated at G. The liquid falling at E and G meets the current A, as indicated at H, and is again carried upwardly, as indicated at B. Some of the liquid falling at H will be drawn back, as indicated at L, to the propeller and forced upwardly against by the propeller, as indicated at C.

It will thus be seen that all parts of the contents of the tank will be thoroughly and uniformly exposed to the vessel walls, so as to be uniformly acted upon by a medium contained in the pocket 32 about the tank, or otherwise applied to the walls of the tank. Where mixing is to be done, the contents will be thoroughly mixed. It will also be seen that the liquid in the portion of the pipe between the valve 11 and the tank will be drawn, as indicated at M and N, into the tank and mixed with the rest, thus preventing the accumulation of a certain portion of the liquid in such part of the pipe which would not be acted upon at all. It will be seen that not only is this prevented, but other eddies or dead spots in the liquid are prevented by my invention, so that all of the liquid will be thoroughly mixed and exposed to the walls of the tank in the operation of the apparatus.

Figure 2:
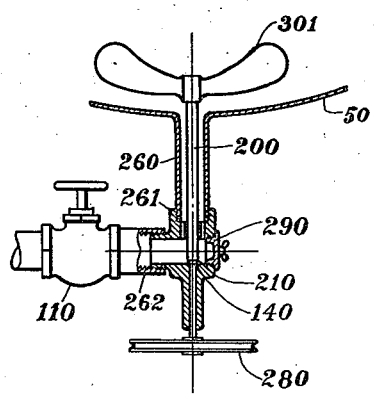
Fig. 2 is a similar view through a second embodiment of my invention, omitting the walls and most of the bottom of the tank.

In Fig. 2 the propeller is shown at 301, the tank at 50, the propeller shaft at 200, the conical thrust bearing at 210 and its companion bearing at 140. The coupling 260 is made integral with the tank and is connected to a pipe coupling at 261 and to which the pipe 262 is connected. The valve is shown at 110. The pulley is shown at 280 and at 290 I show a tap which can be readily removed, so that the pipe can be cleaned.

Figure 3:
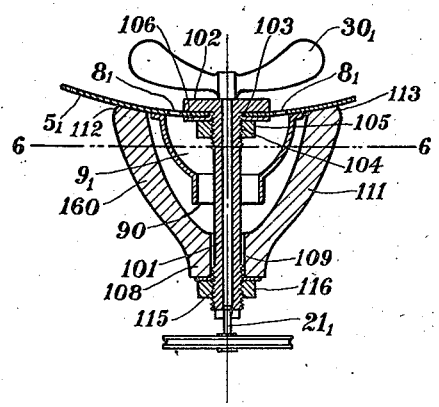
Fig. 3 is a view, similar to the view in Fig. 2, of a third embodiment of the invention.

In Fig. 3 the tank is shown at $5_1$ and the opening therein at $8_1$. The propeller is shown at $30_1$ and the shaft at $21_1$. The pipe is shown at $9_1$ and is cut off, as shown at 90, so that in this particular embodiment the valve is not illustrated. It will be understood, however, that and how this pipe may be provided with an elbow equipped with an opening through which the propeller shaft extends. A sleeve is shown at 101 provided with a shoulder 102 which engages one side of the fall $5_1$, and which extends through a central opening 103 in the opening $8_1$. The sleeve 101 is threaded. At 104 are shown threads on the portion extending through the walls of the tank.

Suitable means are employed for engaging the side of the tank opposite the shoulder 102 and clamping the sleeve to the tank. In the embodiment shown such means consists of a nut 105, which engages the underside of the washer 106. At 108 is shown a yoke having an opening 109 therein. A plurality of horns 160, $160_1$, 111 and $111_1$, extend from said yoke upwardly and outwardly, engaging at their free ends 112 and 113 the outside wall of the tank. The lower end of the sleeve is threaded, as shown at 115, and a nut 116 is employed to draw the yoke and horns upward, so that the ends 112 and 113 will closely and firmly engage the wall of the tank.

Figure 6:
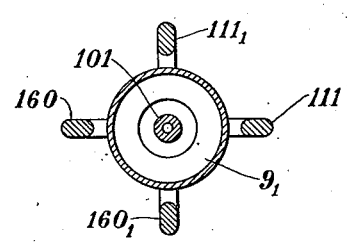
Fig. 6 is a section along the line 6—6 of Fig. 3.

It will readily be seen that in Figs. 3 and 6 I have illustrated apparatus which can be quickly and conveniently removed from one vessel and installed upon another, but can be easily and quickly installed upon a vessel not previously equipped to perform the functions of my invention.

Figure 4:
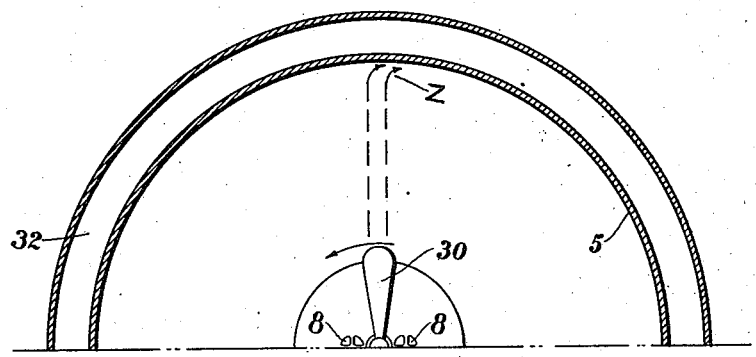
Fig. 4 is a half section through the line 4—4 of Fig. 1.

By reference to Fig. 4, further action of the liquid in Fig. 1 will be seen. The liquid which is carried, as illustrated by the arrows at A, against the cylindrical portion of the tank will be deflected around the tank, as illustrated at Z in Fig. 4.

Figure 5:
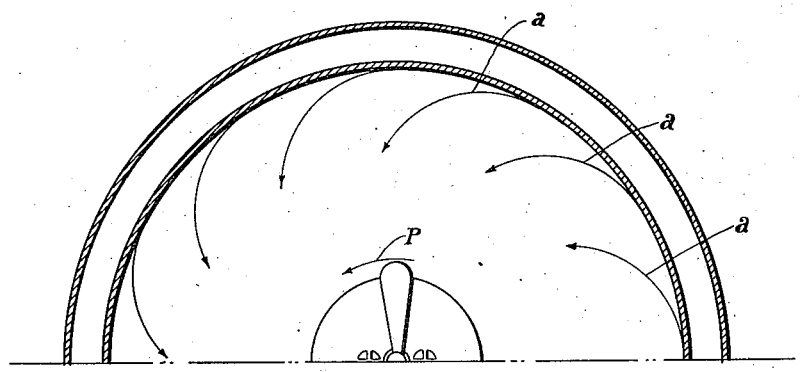
Fig. 5 is a top plan view of a half section of Fig. 1 when the propeller is rotating in the direction of the arrow P.

In addition to the movements of the contents of the tank I have described, the contents, as a mass, will be rotated in the tank about the central axis thereof. Owing, however, to the "skin friction" of the walls of the tank the substance nearest the walls will move slowest. The rate of rotation will be fastest at the center and will decrease in speed from the center to the walls of the tank. I have illustrated this movement, as far as practical, by the lines $a$—$a$ in Fig. 5.

By placing an elbow in the pipe adjacent the tank, I am enabled to run the shaft of the propeller through the opening in the tank at which the pipe is connected, thereby reducing the openings therein, an advantage especially in glass or enamel lined tanks. I am also enabled to so locate the propeller as to prevent the accumulation of materials in the part of the pipe between the valve and the tank.

I have illustrated and described these embodiments of my invention for the purpose of better explaining the same. I do not wish to be limited to such embodiments, or the details thereof, as I contemplate many departures therefrom without departing from the spirit of my invention, which is set forth in the appended claims.

I claim:

1. In mechanism of the class described, the combination of a kettle having cylindrical side walls and a saucer-shaped bottom having an opening in the central part thereof, a vertically arranged propeller shaft projecting through said opening, a horizontally arranged propeller mounted on said shaft adjacent said opening and having its blades part above and part below the line of connection between the bottom and side walls of the tank, whereby when the propeller is operated the material in the tank is driven upwardly in the tank or hurled substantially horizontally toward the sides thereof, the width of the tank being more than one and one-half times as great as the diameter of the propeller, and means through which the shaft and propeller are driven.

2. In mechanism of the class described, the combination of a tank having curved side walls and a bottom inclined downwardly from the sides to the center on all sides, a propeller shaft projecting through the central part of the bottom, and a propeller whose diameter is less than one-third the diameter of the tank mounted on said shaft adjacent the bottom of the tank.

3. In mechanism of the class described, the combination of a tank provided with curved side and bottom walls, a bladed propeller whose diameter is less than one-third the diameter of the tank mounted adjacent the bottom of the tank and a vertically arranged shaft on which the propeller is mounted to drive liquid contents of the tank upwardly and to hurl liquid radially in substantially horizontal directions.

4. In mechanism of the class described, the combination of a tank, a bladed propeller shaft extending through the bottom of the tank, a propeller mounted on said shaft and adapted when operated to drive liquid upwardly in the central part of the tank and to hurl it radially from the propeller in substantially horizontal directions, the diameter of the propeller being less than one-third the diameter of the tank.

5. In mechanism of the class described, the combination of a tank having curved side walls and a bottom inclined downwardly from the sides to the center on all sides, said tank having a centrally located opening in the bottom thereof, a pipe connected to the tank bottom about said opening, a propeller shaft extending through a part of said pipe and through said opening, and a propeller whose diameter is less than one-third the diameter of the tank mounted on said shaft adjacent the bottom of the tank.

6. In mechanism of the class described, the combination of a tank having an opening in the bottom, a pipe connected to said opening and having an elbow therein, a propeller shaft passing through said opening and through the wall of the pipe at the elbow, a bearing in the wall of the pipe for the shaft, a propeller on the shaft in the tank capable of drawing liquid from said pipe and means on the end of the shaft outside of the pipe through which the shaft is driven.

7. In mechanism of the class described, the combination of a cylindrical tank having a saucer-shaped bottom with an opening in the central part of the bottom, a pipe connected to the tank about the opening in the bottom, including an elbow near the opening, said elbow having an opening therein in line with the opening in the bottom of the tank, a bearing in said opening in the elbow, a valve in said pipe below the opening in the elbow, a propeller shaft extending through the bearing in the opening in the elbow and the opening in the bottom of the tank, means on the end of the shaft outside the pipe and tank through which the shaft is driven, a propeller on the shaft in the tank adapted when operated to drive a stream of liquid upwardly in the central part of the tank to draw into the tank liquid from that part of the pipe between said valve and the opening in the tank and to hurl liquid radially against the saucer-shaped bottom of the tank which deflects the liquid upwardly along the edges of the tank, the diameter of the propeller being less than one-third the diameter of the tank, to permit the liquid thus propelled upwardly to return between such two upwardly driven streams.

8. In mechanism of the class described, the combination of a tank having an opening therein, a pipe communicating with said tank through said opening, a valve in said pipe, said pipe including an elbow between said valve and the opening in said tank, said elbow being provided with an opening in line with the opening in the tank, a bearing in said elbow opening, a shaft extending through said openings, means on the end of the shaft outside the elbow through which the shaft is driven, and means on the end of the shaft within the tank adapted to be operated to draw into the tank liquid from the portion of the pipe between the valve and tank.

9. In mechanism of the class described, the combination of a tank having an opening therein, a pipe connected about said opening, a valve in said pipe, a bearing opening in said pipe between said valve and tank in line with the opening in the tank, a shaft passing through said openings, means on the end of the shaft outside the pipe for rotating said shaft and a bladed propeller on the shaft and within the tank for drawing into said tank the liquid in the pipe between the valve and tank.

10. In mechanism of the class described, the combination of a tank, a pipe connected with the tank, a valve in the pipe, and means passing through a part of the pipe between the valve and tank for forcibly drawing into the tank the contents of that part of the pipe between the valve and tank when the valve is closed.

11. In the class of liquid stirring mechanisms which extend through an opening in a vessel wall, the combination of a threaded sleeve having a shoulder on one end adapted to engage one side of a wall of said vessel, a nut threaded on the sleeve and adapted to engage the other side of the wall of the vessel opposite said shoulder, a pair of horns joined together by a yoke having a hole therethrough, said horns engaging said vessel and said sleeve extending through said opening in the yoke, a nut threaded on said sleeve and when drawn down engaging said yoke and drawing said horns tightly against said vessel, a shaft extending through the bore of the sleeve, liquid agitating means on one end of said shaft and means whereby the shaft is rotated on the other end thereof.

12. In the class of liquid stirring mechanisms which extend through a vessel wall, the combination of a sleeve extending through the wall of the vessel, means on the sleeve to grip the wall of the vessel on each side of the vessel wall, a yoke having an opening therein through which said sleeve extends, a pair of horns, one connected to the yoke on each side thereof, and extending to engage the vessel wall, means to draw the ends of the horns against the vessel wall, a shaft extending through the sleeve, liquid agitating means on one end of the shaft and a device through which the shaft is rotated mounted on the other end of the shaft.

13. In combination, a vessel having an opening therein, a pipe leading from said opening, including an elbow with an opening therein, a valve in said pipe, the opening in the elbow being located between the valve and tank, a thrust bearing about the opening in the elbow, a shaft extending through the openings in the elbow and tank, a conical thrust bearing on the shaft adapted to bear against the thrust bearing about the opening in the elbow, liquid stirring mechanism on one end of the shaft and means through which the shaft is rotated located on the other end of the shaft.

14. In combination, a tank having an opening in the bottom thereof, a pipe connected to the tank about said opening including an elbow adjacent the opening in the tank, said elbow having an opening therein in alinement with the opening in the tank, a shaft bearing in said opening, a propeller shaft extending through said alined openings, means on said shaft outside the tank and pipe through which the shaft is rotated and a propeller on the other end of the shaft and in the tank for operating upon matter within the tank.

15. In liquid stirring mechanism which extends through an opening in the wall of a vessel, the combination of a rotatable shaft extending through said opening, means to prevent leakage of the contents of the vessel through said opening, a propeller mounted on said shaft in said vessel, a yoke having an opening through which the shaft extends, a plurality of horns extending from said yoke and adapted to engage the vessel, means to draw said horns against said vessel wall, means to support said shaft in said opening and means through which said shaft is operated.

16. In a device of the class described, the combination of a propeller shaft, a propeller on said shaft and mechanism to removably mount said shaft upon a vessel with the shaft extending through an opening therein and the propeller on the inside of the vessel including a plurality of horns adapted to engage the vessel wall at one end and joined together at the other, and means to support said shaft in said horns.

17. In a device of the class described, the combination of a propeller shaft, means to removably support one part of said shaft in an opening in a vessel wall and to close the opening about said shaft, a propeller on said shaft, means to removably support the part of the shaft outside the vessel wall, including horns, each engaging said vessel wall at one end, and means through which the shaft is rotated.

18. In mechanism of the class described, the combination of an agitating propeller, a shaft therefor adapted to be extended through an opening in a vessel wall, means to removably mount said shaft on said vessel including a yoke provided with an opening through which the shaft extends, a plurality of horns extending from said yoke to said vessel walls and means to force the ends of the horns against the wall of the vessel, and means through which the shaft is rotated.

In witness whereof, I have hereunto set my hand this 11th day of March, 1918.

NIELS D. NIELSEN.